(No Model.)
C. POTTER, Jr.
Reversing Mechanism for Printing-Presses.
No. 229,273. Patented June 29, 1880.
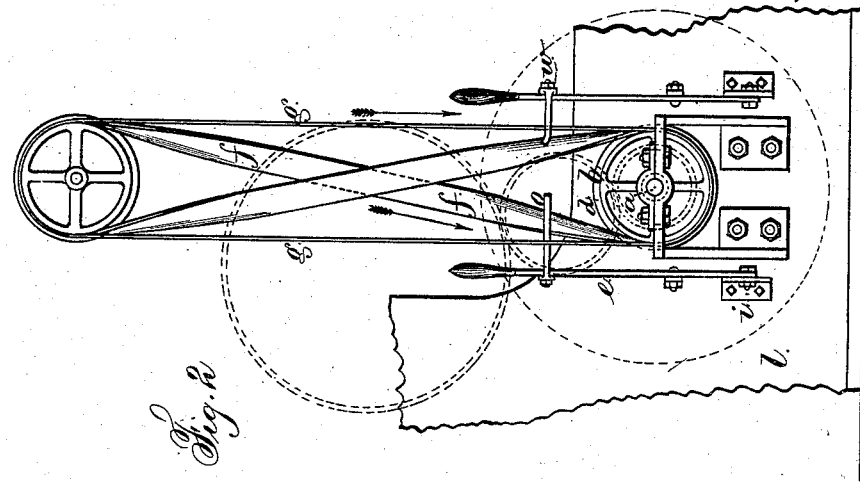
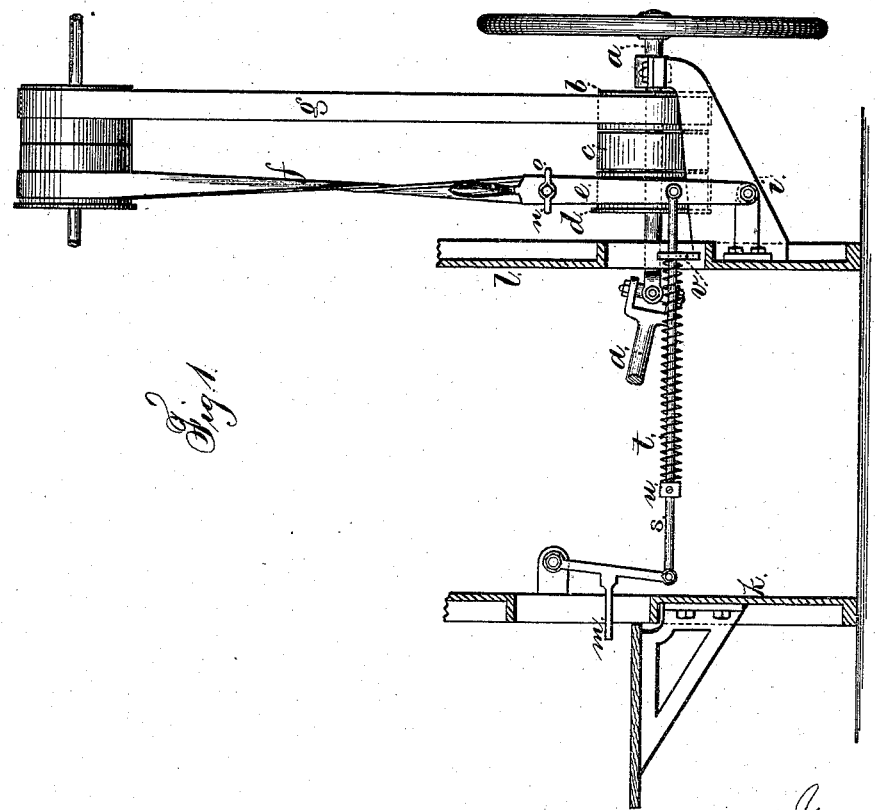
Witnesses
Harold Serrell
Geo. T. Pinckney
Inventor
Charles Potter Jr.
per Lemuel W. Serrell
        Atty.
N. PETERS, PHOTO-LITHOGRAPHER, WASHINGTON, D. C.

UNITED STATES PATENT OFFICE.

CHARLES POTTER, JR., OF PLAINFIELD, NEW JERSEY.

REVERSING MECHANISM FOR PRINTING-PRESSES.

SPECIFICATION forming part of Letters Patent No. 229,273, dated June 29, 1880.

Application filed April 26, 1880. (No model.)

*To all whom it may concern:*

Be it known that I, CHARLES POTTER, Jr., of Plainfield, in the county of Union and State of New Jersey, have invented an Improvement in Reversing Mechanism for Printing-Presses, of which the following is a specification.

In case of the failure to supply a sheet of paper it is important not only to stop the printing-press, but to reverse the movement sufficiently to bring the cylinder into the proper position to receive a sheet before starting the press again.

In printing-presses three pulleys and one belt and belt-shifter have been used, and gearing between the two outer pulleys has communicated motion to the respective parts, so that when the belt is driving one of the outer pulleys the press is moved in the usual way, and when the belt is shifted to the other outer pulley the parts are moved by the intermediate gearing the other way.

This device is complicated and expensive, and the mechanism that is usually operative in driving the press is subject to unnecessary friction.

Other devices in which gearing has been employed for the aforesaid purposes are subject to objection on account of costliness and friction.

In planing-machines for metal three pulleys and two belts have been used with a belt-shifter, one belt being crossed; but the belts and shifting devices are not adapted to use in a printing-press, because they run the mechanism first one way and then the other.

In a printing-press the reversing device is only brought into action occasionally, as circumstances may render necessary.

My invention consists in the combination, with three pulleys and the straight and crossed belts, of belt-shifters, spring, and treadle, the parts being arranged and constructed so that the attendant, after stopping the press, can run the same back to the proper place, and by releasing the treadle cause the press to stop and remain stationary until it is started again by the attendant.

By this improvement the press can be stopped instantly, after which the parts are returned to the position that they should occupy for receiving a sheet of paper.

In the drawings, Figure 1 is an elevation of the stopping and reversing mechanism, and Fig. 2 is an elevation of the same at right angles to Fig. 1, and this also shows the starting mechanism.

The shaft $a$ is supported in suitable bearings, and it is connected to the press in any usual manner. There are upon this shaft $a$ three pulleys, the pulley $b$ being loose, the pulley $c$ fast on the shaft, and the pulley $d$ loose. It is preferable to have a flange or edge to this loose pulley $d$, to prevent the cross-belt $f$ running off, as the same does not require to be tight. On the contrary it is preferable that this belt should be rather loose, in order that it may slip upon the pulleys and not run the press back as rapidly as it might do if it were as tight as the straight driving-belt $g$. I remark that both these belts may extend from the pulleys $b\ c\ d$ to one driving-pulley of sufficient length of face to receive such belts.

At $k$ a portion of the frame-work of the press shown, and $l$ is the frame within which the pulleys $b\ c\ d$ and shaft $a$ are supported.

The ordinary belt-shifter $w$ is operated by a lever, in any usual manner, to move the driving-belt $g$ upon or off of the fast pulley $c$. The belt-shifter is made as a lever, $e$, upon the fulcrum $i$, and the same is provided with the belt-shifting fingers $n$ and $o$ at the opposite edge of the crossed belt $f$. The slide-rod $s$ is pivoted to this belt-shifter $e$, and it passes to the treadle $m$, and there is a spring, $t$, around the rod $s$, acting between the collar $u$ thereon and the fixed abutment $v$, to move the belt-shifter in the opposite direction to the movement given by the treadle. If the press has to be stopped, the attendant moves the ordinary belt-shifter, throwing the driving-belt upon the loose pulley $b$. When the press is to be reversed the treadle is depressed and the rod is moved endwise, compressing the spring $t$ and moving the belt-shifting lever $e$, throwing the cross-belt upon the pulley $c$ and causing said belt $f$ to operate and slowly turn the press back to the required point. As soon as the treadle is released the spring $t$ moves the belt-shifter and removes the cross-belt from the pulley $c$ to the pulley $d$, stopping the backward movement and leaving the belt $g$ upon the pulley $b$.

By my improvement the mechanism for stopping, reversing, and starting the press is rendered very simple, and it is entirely under the control of the attendants; and I remark that there should be a handle at the upper end of the belt-shifting lever, so that it may be operated by hand at that side of the press.

I claim as my invention—

1. The combination, with the fast and two loose pulleys, of a straight and a crossed belt and two belt-shifting devices, one of which moves the belt for stopping the press and the other operates the belt that reverses the press, substantially as set forth.

2. The combination, with the fast and two loose pulleys, one at each side of the fast pulley, of the belt-shifting lever $e$, fingers $n$ $o$, to move the cross-belt in either direction, the slide-rod $s$, spring $t$, and treadle, constructed and arranged substantially as set forth.

Signed by me this 21st day of April, A. D. 1880.

CHARLES POTTER, JR.

Witnesses:
GEO. T. PINCKNEY,
HAROLD SERRELL.